United States Patent
Kim et al.

(10) Patent No.: US 7,127,260 B1
(45) Date of Patent: Oct. 24, 2006

(54) APPARATUS AND METHOD FOR DETERMINING PAGING ALERT MODE IN A MOBILE COMMUNICATION SYSTEM

(75) Inventors: Kyou-Woong Kim, Suwon-shi (KR); Jae-Min Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 825 days.

(21) Appl. No.: 09/691,541

(22) Filed: Oct. 18, 2000

(30) Foreign Application Priority Data

Oct. 18, 1999 (KR) ................................ 1999-45159

(51) Int. Cl.
*H04Q 7/20* (2006.01)

(52) U.S. Cl. ................................ 455/456.4; 455/404.2; 455/414.2; 455/440; 455/456.1; 455/567

(58) Field of Classification Search ................ 455/31.2, 455/456–457, 561, 565, 418–420, 38.2–38.4, 455/462, 567, 458, 31.1, 432–435, 404, 414, 455/518–519, 404.2, 414.2, 435.1, 440, 486.1–486.3, 455/414.1; 340/825.44
See application file for complete search history.

(56) References Cited

U.S. PATENT DOCUMENTS

| | | | | |
|---|---|---|---|---|
| 5,966,655 A * | 10/1999 | Hardouin | ................... | 455/418 |
| 5,966,662 A * | 10/1999 | Murto | ........................ | 455/458 |
| 6,356,762 B1* | 3/2002 | Guenther | .................. | 455/456.4 |
| 6,421,544 B1* | 7/2002 | Sawada | ........................ | 455/565 |
| 6,438,385 B1* | 8/2002 | Heinonen et al. | ........... | 455/501 |
| 6,449,481 B1* | 9/2002 | Kwon et al. | ................ | 455/437 |
| 6,463,265 B1* | 10/2002 | Cohen et al. | ............. | 455/186.1 |
| 6,463,289 B1* | 10/2002 | Havinis et al. | .......... | 455/456.4 |
| 6,496,701 B1* | 12/2002 | Chen et al. | ............... | 455/456.5 |
| 6,510,321 B1* | 1/2003 | Ritzen et al. | ............... | 455/450 |
| 6,549,531 B1* | 4/2003 | Charas | ....................... | 370/347 |
| 6,625,428 B1* | 9/2003 | Finnell et al. | ........... | 455/115.1 |
| 6,633,758 B1* | 10/2003 | Heinonen et al. | .......... | 455/418 |
| 6,643,517 B1* | 11/2003 | Steer | ........................ | 455/456.4 |
| 6,647,257 B1* | 11/2003 | Owensby | ................. | 455/414.1 |
| 6,671,506 B1* | 12/2003 | Lee | ............................. | 455/406 |
| 6,721,542 B1* | 4/2004 | Anttila et al. | .................. | 455/68 |

* cited by examiner

*Primary Examiner*—Pablo N. Tran
(74) *Attorney, Agent, or Firm*—Dilworth & Barrese LLP

(57) ABSTRACT

Disclosed is a method for determining a paging alert mode of a mobile terminal in a mobile communication system. The mobile terminal determines whether there exists a sub-BTS, depending on a broadcasting channel message provided in a cell formed by a main BTS. When the sub-BTS exists, the mobile terminal monitors receipt of a beacon paging group frame from the sub-BTS, and upon receipt of the beacon paging group frame, changes the paging alert mode to a predetermined paging alert mode.

17 Claims, 9 Drawing Sheets

APPARATUS AND METHOD FOR DETERMINING PAGING ALERT MODE IN A MOBILE COMMUNICATION SYSTEM

PRIORITY

This application claims priority to an application entitled "Apparatus and Method for Determining Paging Alert Mode in a Mobile Communication System" filed in the Korean Industrial Property Office on Oct. 18, 1999 and assigned Ser. No. 99-45159, the contents of which are hereby incorporated by reference.

BACKGROUND OF THE INVENTION

1. Field of the Invention

The present invention relates generally to an apparatus and method for determining a paging alert mode in a mobile communication system, and in particular, to an apparatus and method for determining a paging alert mode of a mobile terminal in a base transceiver system(BTS).

2. Description of the Related Art

A rapid growth of the mobile communication business has caused a rapid increase in population of the mobile subscribers. Further, as the population of the mobile subscribers increases rapidly, the mobile communication service providers are competing against each other to attract many subscribers by providing the services differentiated from those of other mobile communication service providers.

FIG. 1 illustrates a conceptional cell structure of a conventional mobile communication system, in which one cell 20 is formed by its associated base station (BTS) 30.

A paging operation of the conventional mobile communication system will be described with reference to the above cell structure. Upon receipt of a paging request from a core network (CN), a core network (CN) determines a paging-requested mobile terminal. After determining the paging-requested mobile terminal, the RNC 10 calculates a paging group to which the mobile terminal belongs, using an identification (ID) of the paging-requested mobile terminal. Calculation of the paging group is accomplished by mapping the ID of the mobile terminal to a given mapping group. At this point, all the mobile terminals within the cell are uniformly distributed to the paging groups constituting a PICH(Paging Indicator Channel). FIG. 2 illustrates a structure of the PICH required for the paging operation in the conventional mobile communication system. As illustrated in FIG. 2, the PICH used in the conventional mobile communication system is comprised of a specified number (e.g., 144 in FIG. 2) of paging group frames. Therefore, "uniform distribution" refers to uniformly matching the number of the mobile terminals belonging to the respective paging group frames.

Meanwhile, after completing calculation of the paging group to which the paging-requested mobile terminal belongs, the RNC 10 creates a frame which the paging group sets to 1. The paging group frame is created such that it should have paging information for paging a specific mobile terminal. Based on the broadcasting message, the mobile terminal determines the number of paging groups that exists and determines whether a particular paging group's bit is '1' or '0'. If the paging group's bit is determined to be '1', the mobile terminal demodulates the S-CCPH channel after certain amount of delay and reads the identification message of the mobile terminal. As a result, if it is determined to contained the ID of the mobile terminal, the mobile terminal determines that paging exists and starts the RRC(Radio Resource Control) connection procedure.

Upon power-on, the corresponding mobile terminal calculates a paging group to which it belongs, using its mobile ID and the information of number of PI(Paging Indicator) of broadcast channel. Calculation of the paging group is accomplished by the same method as that used in the BTS to calculate the paging group using the mobile ID. After that, the mobile terminal proceeds to a suspended mode, and turns on radio frequency receive power (RF Rx power) at a position assigned for the calculated paging group out of the slots constituting the physical channel, to determine whether there exists paging. That is, all the mobile terminals located in the cell 20 continuously monitor the paging information corresponding to the paging groups to which they belong. That the mobile terminal continuously monitors its paging information means that the mobile terminal is enabled at a time when the corresponding slot of the physical channel over which the paging information of its paging group is transmitted, to read all the information loaded in the slot. The existence or nonexistence of paging is determined by checking the number of the PI bits with logic '1' If the base station has 144 paging groups as shown in FIG. 4, one PI is made of 2 bits. If it is determined that the 2 bits of PI is logic '1' after examining the bits, S-CCPCH channel is read after certain amount of delay. After the demodulation of S-CCPCH, the mobile terminal generates an alert tone in a paging alert mode set by the subscriber. The alert mode set by the mobile terminal can be divided into a melody mode in which paging is indicated using a melody, a vibration mode in which paging is indicated by vibration, and a mute mode in which paging is indicated through a display. As mention above, such an alert mode can be set by only the subscriber's manipulating the mobile terminal in person.

As described above, when paging occurs for a specific mobile terminal, the RNC and the BTS of the conventional mobile communication system service only the function of simply paging the corresponding mobile terminal through the physical channel. That is, the conventional mobile communication system controls only the radio communication service but cannot control the function of changing the paging alert mode provided in the mobile terminal. Accordingly, in order to change the paging alert mode according to the surroundings, the subscriber should change the mode by manipulating the keypad prepared in the mobile terminal in person, suffering inconveniences.

SUMMARY OF THE INVENTION

It is, therefore, an object of the present invention to provide a method for setting a paging alert mode in a mobile communication system.

It is another object of the present invention to provide a method for setting a paging alert mode of a mobile terminal under the control of a BTS(Base Transceiver System) according to a position of the mobile terminal in a mobile communication system.

It is further another object of the present invention to provide a method for setting a paging alert mode of a mobile terminal located in a sub-cell in a mobile communication system.

It is yet another object of the present invention to provide a method for setting a paging alert mode of a mobile terminal under the control of a BTS in a mobile communication system.

To achieve the above and other objects, a BTS of a mobile communication system informs a mobile terminal that the cell to which the mobile terminal is presently located includes a sub-cell. The mobile terminal periodically examines a beacon paging group provided from the sub-cell, and upon detecting the beacon paging group, sets a silent paging alert mode.

In accordance with one aspect of the present invention, there is provided a method for determining a paging alert mode of a mobile terminal in a mobile communication system. The mobile terminal determines whether there exists a sub-BTS, depending on a broadcasting channel message provided form a main BTS. When the sub-BTS exists, the mobile terminal monitors receipt of a beacon paging group frame from the sub-BTS, and upon receipt of the beacon paging group frame, changes the paging alert mode to a predetermined paging alert mode.

In accordance with another aspect of the present invention, there is provided a method for determining a paging alert mode in a mobile communication system. A main BTS inserts sub-cell information for a sub-cell and a beacon paging period in a broadcasting channel message and transmitting the broadcasting channel message, when the sub-cell exists in a main cell formed by the main BTS. Upon receipt of a paging request from a core network, a radio network controller transmits paging request information with a paging group frame to which a paging-requested mobile terminal belongs, out of paging group frames in a PICH. A sub-BTS forms the sub-cell and transmits a beacon paging group frame requesting a change of the paging alert mode in sync with the paging group frames.

In accordance with further another aspect of the present invention, there is provided an apparatus for determining a paging alert mode in a mobile communication system. In the apparatus, a main BTS forms a main cell, and inserts, when there exists a sub-cell in the main cell, sub-cell information for the sub-cell and a beacon paging period in a broadcasting channel message before transmission. A radio network controller transmits paging request information with the paging group frame to which a paging-requested mobile terminal belongs, out of the paging group frames in the PICH. A sub-BTS forms the sub-cell, and transmits a beacon paging group frame requesting a change of the paging alert mode in response to an interrupt from the radio network controller. A mobile terminal sets the paging alert mode according to whether the beacon paging group frame is accessed, and performs the set paging alert mode when paging is detected by accessing the paging group frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Although the term "node B" is used in an UMTS (Universal Mobile Telecommunication System) system which forms asynchronous main cell and sub-cell which are necessary elements in implementing the present invention, the term "base station (BTS)" will be used for the same meaning in the following description.

Figure 3:
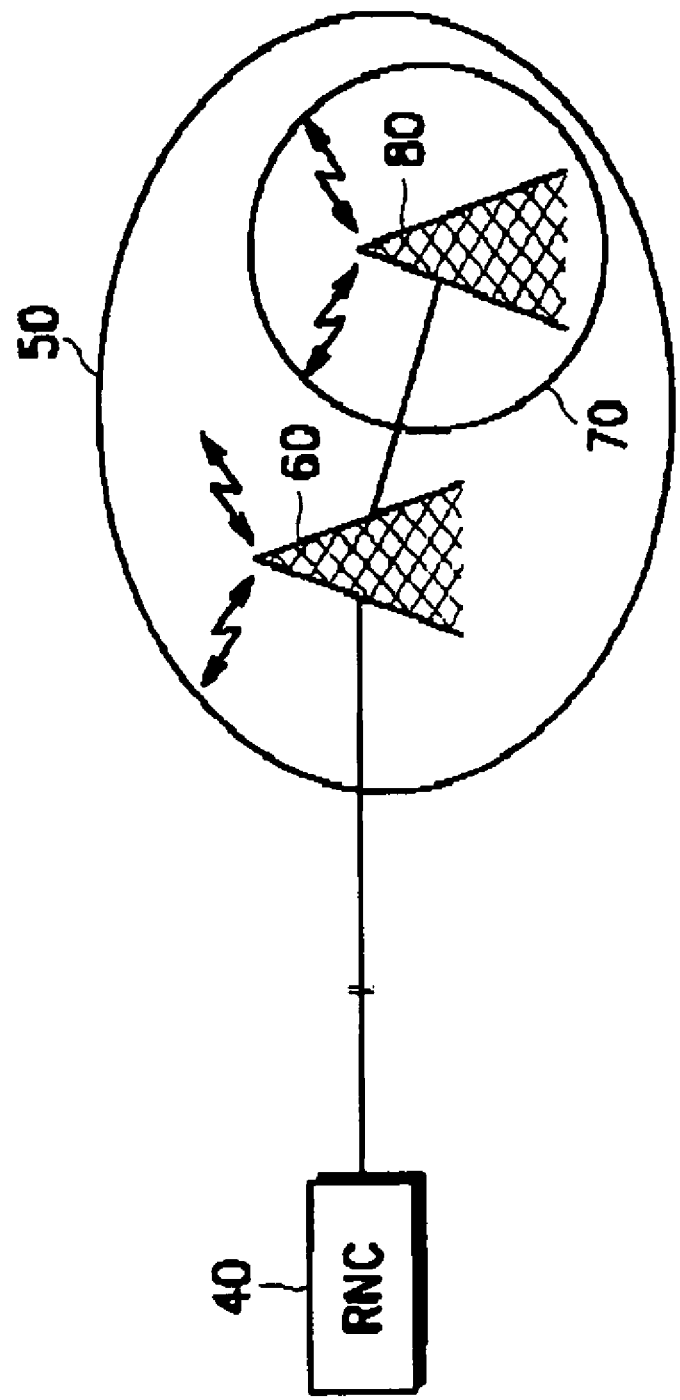
FIG. 3 is a diagram illustrating a conceptional cell structure of a mobile communication system according to an embodiment of the present invention.

FIG. 3 illustrates a conceptional cell structure of a mobile communication system for proposing a paging alert mode according to an embodiment of the present invention. As illustrated in FIG. 3, an exemplary embodiment of the present invention has a fundamental cell structure in which a sub-cell 70 is formed within a main cell 50. Thus, the embodiment separately includes a main BTS 60 for forming the main cell 50 and a sub-BTS 80 for forming the sub-cell 70. The main BTS 60 located in the main cell 50 and the sub-BTS 80 located in the sub-cell 70 are controlled by a radio network controller (RNC) 40.

Now, a detailed description of the embodiment will be made with reference to FIG. 3.

Figure 4:
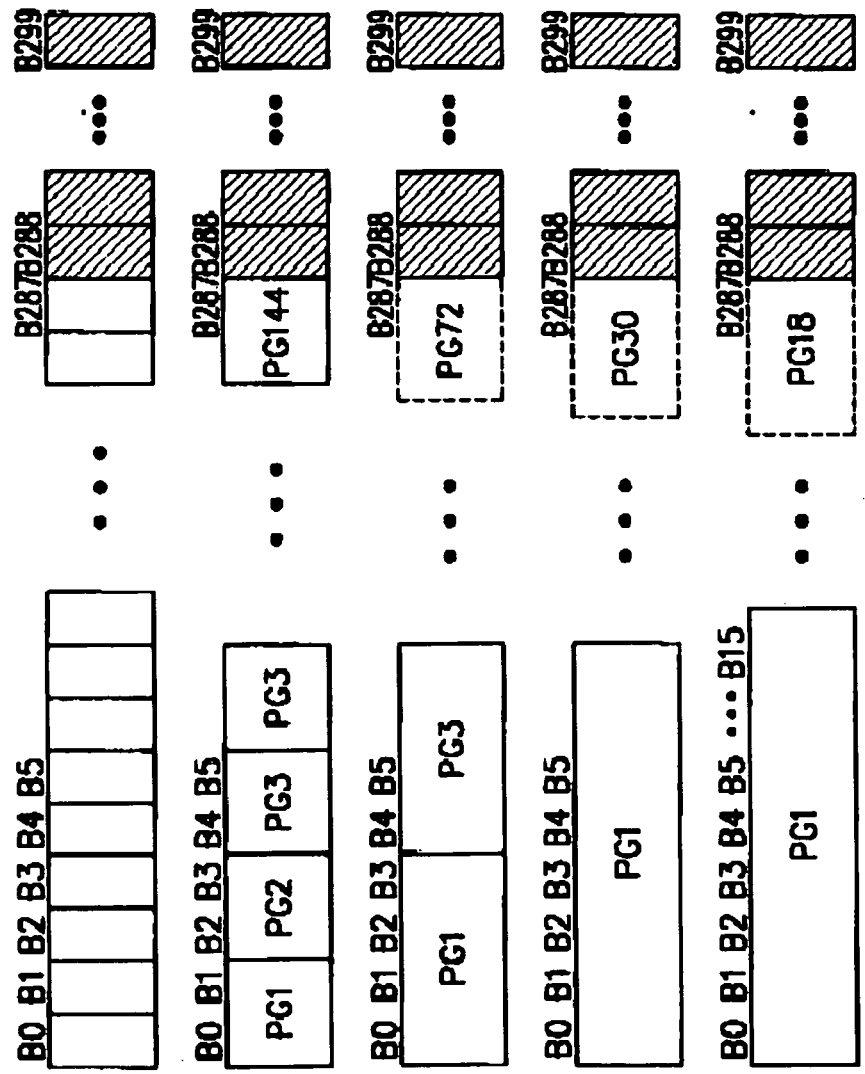
FIG. 4 is a diagram illustrating a structure of a PICH including a beacon paging group according to an embodiment of the present invention.

The main BTS 60 has the function of processing various messages transmitted and received over the corresponding channel to implement the radio communication service with the mobile terminals located in the main cell 50. In particular, the main BTS 60 transmits a broadcasting channel (BCH) message to all the mobile terminals in the main cell 50 at stated periods in order to implement the present invention. Here, the broadcasting channel message being transmitted at stated periods refers to the message transmitted by the broadcasting channel commonly used in the mobile communication system. The channel which can be used as the broadcasting channel includes a channel over which the main BSC 60 can simultaneously transmit a message to all the mobile terminals within the main cell 50. Meantime, the message transmitted by the broadcasting channel includes system information. The system information is comprised of various IDs (e.g., present network ID, location ID and cell ID), all the information to be used in measuring a candidate cell for handover and cell selection, information about the control channel in the present cell, information for controlling use of a random access channel (RACH), protocol information, and additional information required for implementation of the present invention. The additional information is comprised of a beacon paging period and sub-cell information including beacon paging group ID as information for defining the different specifications supported in the cell. The sub-cell information designates a beacon paging group according to existence of the sub-cell in the main cell 50 where the mobile terminal is presently located. The beacon paging period is a period for which a beacon paging group frame is generated by the sub-cell. The operation of the main BTS 60 for generating the broadcasting channel message and transmitting the generated message is performed according to the procedure shown in FIG. 6, which will be described later. In addition, the main BTS 60 transmits the paging group frames provided from the RNC 40 to the mobile terminals in the main cell 50 over the physical channel. The paging group frames being transmitted over the physical channel constitute a PICH (Paging Indicator Channel), an exemplary structure of which is shown in FIG. 4. The Main BTS does not transmit the shaded portion (the beacon paging group), but the Sub BTS transmits paging mode information in the shaded portion. A detailed description of the structure will be given later.

In the sub-BTS 80, there exists only the PICH physical channel and the beacon paging group frames being transmitted over the physical channel are delivered only to the mobile terminals located in the sub-cell 70. Here, the beacon paging group frames are transmitted in sync with the paging group frame being transmitted over the physical channel in the main BTS 60. The operation of transmitting the beacon paging group frames by the sub-BTS 80 is performed according to the procedure shown in FIG. 8, which will be described later. The structure of the beacon paging group frame is comprised of the beacon paging group information. The "beacon paging group" refers to paging groups assigned to the sub-cell 70 and and the shaded portion in FIG. 5. The beacon paging group information is information to be inserted in the beacon paging group frames and is information for informing the mobile terminal that it is presently located in the sub-cell 70

The RNC 40 generates a paging message in response to a paging request from a core network (NC), and provides the generated paging message to the main BTS 60, to transmit the paging message to the mobile terminals located in the main cell 50. The paging exsistence/non exsistence generated by the RNC 40 constitutes a PICH, and the PICH is comprised of a plurality of paging group frames. The paging group frames correspond to their associated paging groups, and assignment of the paging groups is performed according to the mobile terminals. That is, every mobile terminal has its associated paging group to which it belongs, and the paging group is determined according to each mobile ID and the number of bits in PI which forms the PICH. Further, the RNC 40 creates a different PICH according to whether the main BTS 60 includes the sub-BTS 80. That is, when the sub-BTS 80 does not exist, all the frames for constituting the PICH are assigned as paging group frames. However, when the sub-BTS 80 exists, only the frames excepting the beacon paging group frames assigned to the sub-BTS 80 are assigned as the paging group frames. Here, the beacon paging group frames are created by the sub-BTS 80 as mentioned above, and the RNC 40 generates an interrupt for allowing the sub-BTS 80 to generate the beacon paging group frames in sync with the PICH created by it. An exemplary structure of the PICH created by the RNC 40 is shown in FIG. 4. As can be understood from FIG. 4, although the PICH can be comprised of 300 bits in total, if the $288^{th}$ bit is used as PI (paging indicator), the remaining 12 bits are not used. However, the remaining 12 bits are used for beacon paging.

As described above, in an embodiment of the invention, the common paging group frames are transmitted from the main BTS 60, and only the part designated as the beacon paging group frame is transmitted from the sub-BTS 80. Therefore, in the embodiment of the present invention, it is necessary to accurately synchronize the frames transmitted from the main BTS 60 with the frame transmitted from the sub-BTS 80. The reason is to enable the mobile terminal to receive the paging group frames transmitted from the main BTS 60 and the beacon paging group frame transmitted from the sub-BTS 80 as PICH. The main BSC 60 and the sub-BSC 80 generate PICH based on the information from the RNC 40, but the sub-BSC 80 includes paging alert mode information in the beacon paging group. The sub-BSC 80 synchronizes the transmission of the PICH with the CPICH frame boundary of the main BSC 60. Thus, the main BSC 60 and the sub-BSC 80 have same SFN (System Frame Number) and transmit PICH based on the SFN. If RNC 40 orders the main BSC 60 and sub BSC 80 to transmit a specific PICH with a specific SFN, the main BSC 60 and the sub BSC 80 will transmit the specified PICH with the specified SFN. However, sub BSC 80 includes beacon information in the transmission.

The present invention should include the following operations in order to change the paging alert mode of a mobile terminal in the BTS.

First, the main BTS 60 should include an operation of transmitting the beacon paging group information based on existence of the sub-cell 70 to all the mobile terminals located in the main cell 50 through the broadcasting channel.

Second, the RNC 40 should include an operation of transmitting the PICH comprised of the paging group frames to the mobile terminals located in the main cell 50 through the main BTS 60 in response to a paging request.

Third, the sub-BTS 80 should include an operation of transmitting the beacon paging group frame to the mobile terminals located in the sub-cell 70 in response to the paging request.

Fourth, the mobile terminals should include an operation of setting the paging alert mode by examining the beacon paging group frame provided from the sub-BTS 80 based on the beacon paging group information provided from the main BTS 60 over the broadcasting channel.

Fifth, the mobile terminals should include an operation of examining a paging group frame transmitted from the RNC 40 through the main BTS 60 and indicating, upon detecting paging information, occurrence of paging by the set paging alert mode.

Now, a detailed description will be made of the operations required in the invention with reference to the accompanying drawings. In the following description, the operations will be divided into an operation performed by the main BTS 60, the sub-BTS 80 and the RNC 40, and an operation performed by the mobile terminals.

First, the above-stated first to third required operations will be described in detail with reference to the structure of the main BTS 60 and the sub-BTS 80 according to an embodiment of the present invention.

Figure 5:
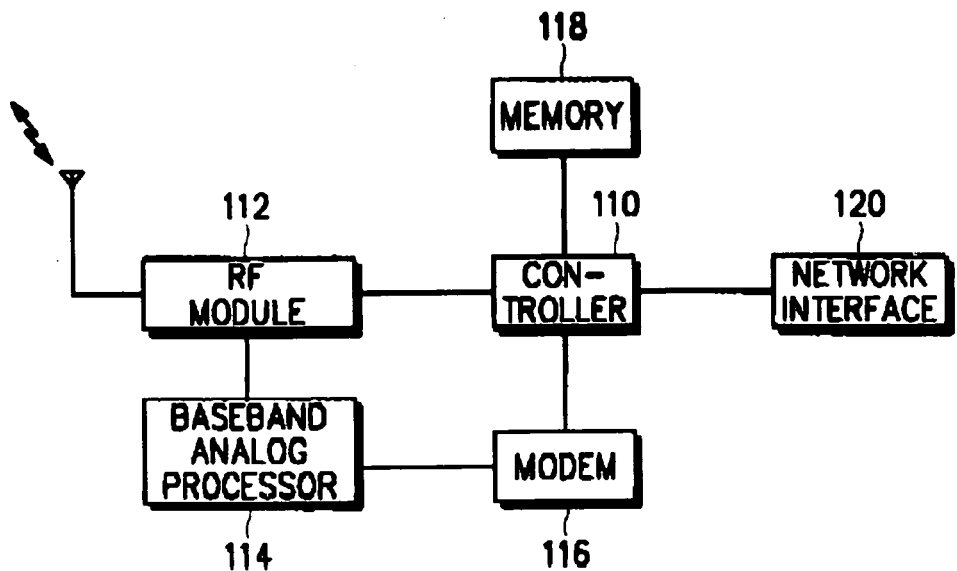
FIG. 5 is a block diagram illustrating a structure of a main BTS according to an embodiment of the present invention.

The structures of the main BTS 60 and the sub-BTS 80 according to an embodiment of the present invention are shown in FIG. 5. The main BTS 60 and the sub-BTS 80 have the same hardware structure. Therefore, in describing the structure of FIG. 5, the main BTS 60 and the sub-BTS 80 will both be called "BTS".

Referring to FIG. 5, the structure of the BTS will be described. A controller 110 controls the overall operation of the BTS. In particular, the controller 110 performs an overall control operation of generating a broadcasting channel message and transmitting the generated broadcasting channel message over the broadcasting channel for implementing the invention. Further, the controller performs a control operation of transmitting the PICH comprised of the paging group frames provided from the RNC 40. A network interface 120 has the function of interfacing information transmitted between the RNC 40 and the sub-BTS 80 under the control of the controller 110. A memory 118 stores various information generated by a control program in the controller 110 according to an embodiment of the present invention. A modem 116 processes transmitting/receiving information to/from the mobile terminals under the control of the controller 110. A baseband analog processor 114 processes a baseband analog signal provided from an RF module 112 and provides the processed signal to the modem 116. Further, the baseband analog processor 114 processes information provided from the modem 116 into a baseband analog signal and provides the processed signal to the RF module 112. The RF module 112, under the control of the controller 110, processes a radio signal received through an antenna and provides the processed radio signal to the baseband analog processor 114. Further, the RF module 112 processes the baseband analog signal from the baseband analog processor 114 into a radio signal and transmits the radio signal through the antenna.

First Operation

Figure 6:
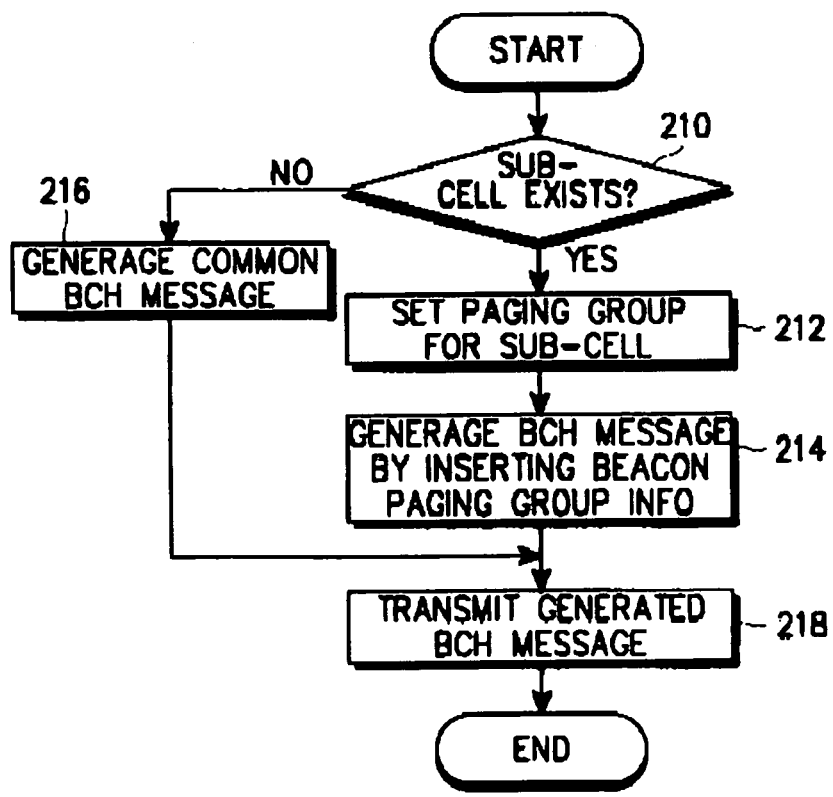
FIG. 6 is a flow chart illustrating a procedure for generating a broadcasting channel (BCH) message in a main BTS according to an embodiment of the present invention.

With reference to FIG. 6, a detailed description will be made regarding an operation of transmitting the broadcasting channel message, which corresponds to the above-stated first operation.

The main BTS 60 determines in step 210 whether there is any sub-cell 70 existing within the main cell 50. Existence of the sub-cell 70 means that there exists a location within the main cell 50, where the paging alert tone should be restricted, such as a public performance hall and a public conference room. If it is determined in step 210 that there does not exist the sub-cell 70, the main BTS 60 proceeds to step 216 and generates a common broadcasting channel (BCH) message. The common broadcasting channel message is used to transmit mobile communication system information required for radio communication to all the mobile terminals within the cell at stated periods. The mobile communication system information transmitted through the broadcasting channel message is comprised, as stated above, of various IDs (e.g., present network ID, location ID and cell ID), all the information to be used in measuring a candidate cell for handover and cell selection, information about the control channel in the present cell, information for controlling use of a random access channel (RACH) and protocol information. The broadcasting channel message has not been specified by the present standard of a future mobile communication system, and the broadcasting channel message used in the invention can be implemented for any future standard structure.

Otherwise, if it is determined in step 210 that the sub-cell 70 exists, the main BTS 60 sets a paging group for the sub-cell 70 in step 212. The paging group for the sub-cell 70 means a beacon paging group, and the paging group is set by designating the 12 bits of the paging group as logic '1'. After setting the beacon paging group in step 212, the main BTS 60 proceeds step 214 where the main BTS 60 generates a broadcasting channel (BCH) message by inserting the additional information required for implementing the present invention in the information constituting the common broadcasting channel message. The additional information required for implementing the present invention includes sub-cell information and a beacon paging period, and the additional information can be determined by the beacon paging group set in step 212. In addition, the beacon paging period can be set to be equal to the transmission period of the PICH or to the multiple of the transmission period of the PICH.

Meantime, after completing generation of the broadcasting channel message in step 216 or 214, the main BTS 60 transmits the generated broadcasting channel message to all the mobile terminals located in the main cell 50, in step 218. Transmission of the broadcasting channel message can be performed at predefined periods or at the request of the upper layer.

Second Operation

Figure 7:
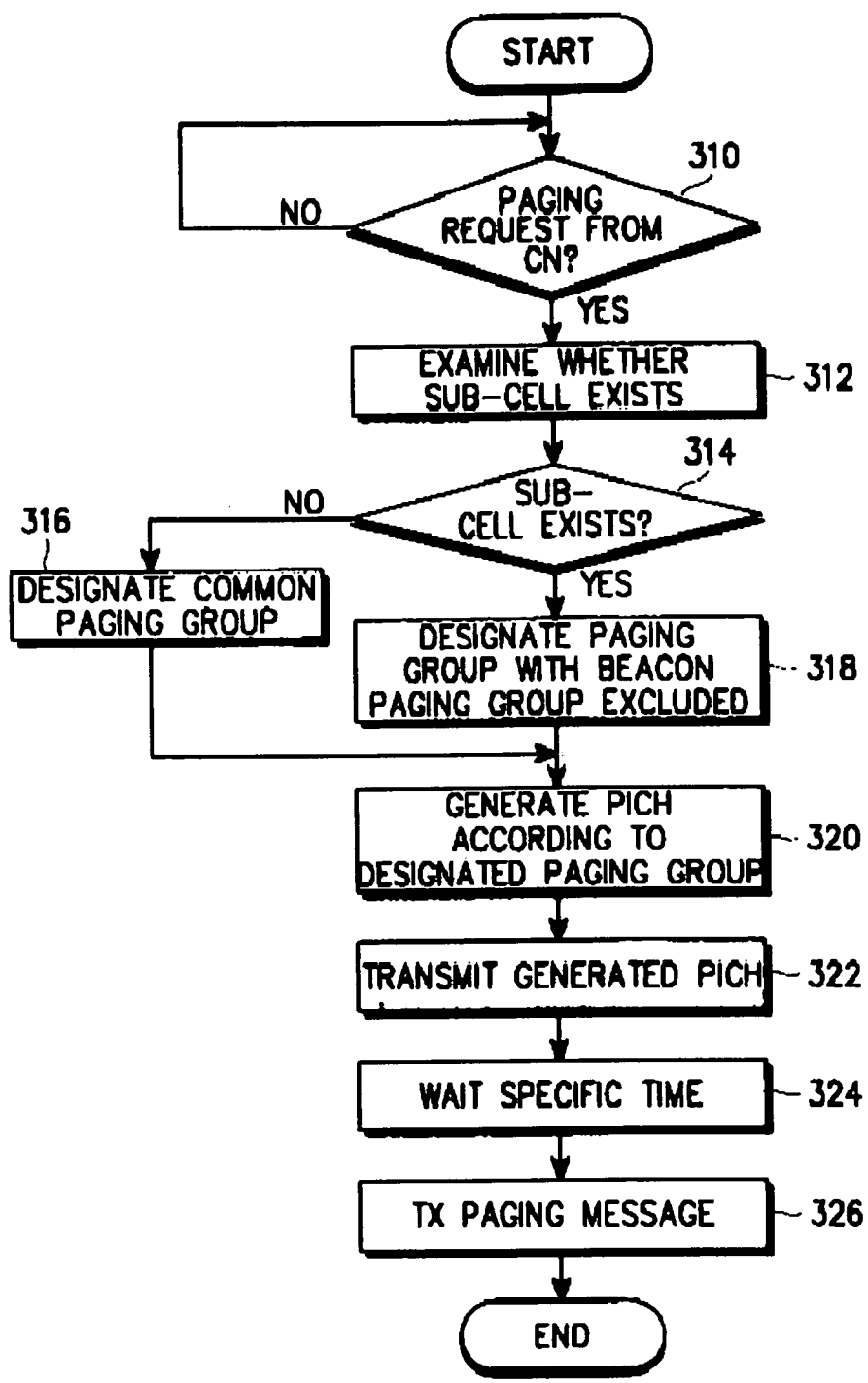
FIG. 7 is a flow chart illustrating a procedure for transmitting a paging group frame in response to a paging request in a radio network controller (RNC) according to an embodiment of the present invention.

With reference to FIG. 7, a detailed description will be made regarding an operation in which the RNC 40 transmits the paging group frames to all the mobile terminals located in the main cell 50 through the main BTS 60 in response to a paging request. This operation corresponds to the above-stated second operation.

The RNC 40 monitors in step 310 whether a paging request for paging a specific mobile terminal is generated from the core network which is the upper layer. Upon detecting the paging request in step 310, the RNC 40 examines, in step 312, the cell in which the paged mobile terminal is presently located and determines whether there exists a sub-cell taking the examined cell as a main cell. That is, it is determined whether there exists the sub-cell 70 formed by the sub-BTS 80 within the main cell 50 formed by the main BTS 60, as shown in FIG. 3. As one method for determining existence of the sub-cell 70, the RNC 40 can manage information about its BTS using a table and determine existence of the sub-cell by searching the table. Although there are several different methods, the detailed description will be avoided herein. The RNC 40 determines in step 314 whether there exists the sub-cell 70, based on the examination performed in step 312. If it is determined in step 314 that there does not exist the sub-cell 70, the RNC 40 designates a common paging group using an ID of mobile terminal to be paged, in step 316. Commonly, an ID of the mobile terminal to be paged and the number of the paging groups constituting the PICH should be determined to designate the paging group. The reason is to enable all the mobile terminals belonging to the RNC 40 to be evenly distributed to the respective paging groups according to the number of the paging groups constituting the PICH.

Otherwise, if it is determined in step 314 that the sub-cell 70 exists, the RNC 40 proceeds to step 318. In step 318, a PICH same as the main cell is formed, and the beacon paging group is all set to logic '1'.

Meanwhile, after determining the paging group to which the mobile terminal belongs in steps 316 and 318, the RNC 40 assembles a paging message according to the determined paging group in step 320. The paging message is assembled in the form of the above-described PICH, and the number of the paging group frames constituting the PICH is determined according to existence/nonexistence of the sub-cell 70 or with the beacon group excluded. That is, when the sub-cell 70 does not exist, all the frames constituting the PICH are used for the paging group frame, and otherwise, when the sub-cell 70 exists, the frames excepting the frame designated as the beacon paging group frame out of all the frames constituting the PICH are used for the paging group frame. For example, assume that the PICH is comprised of 288 bits and the beacon paging group frame is comprised of shadowed frame, as shown in FIG. 4. In this case, if the sub-cell 70 does not exist, the paging message created in step 320 will become a PICH comprised of 288 bits. Otherwise, if the sub-cell 70 exists, the paging message created in step 320 will become a PICH comprised of 288 bits and 12 bits beacon paging group frames.

The RNC 40 transmits the generated paging message to the BTS corresponding to the cell where the mobile terminal to be paged is located, in step 322. The BTS where the mobile terminal is located is determined according to position information of the mobile terminal, managed by the network. Meanwhile, upon receipt of the paging message from the RNC 40, the BTS transmits the received paging message to all the mobile terminals within the cell through the physical channel.

Third Operation

Figure 8:
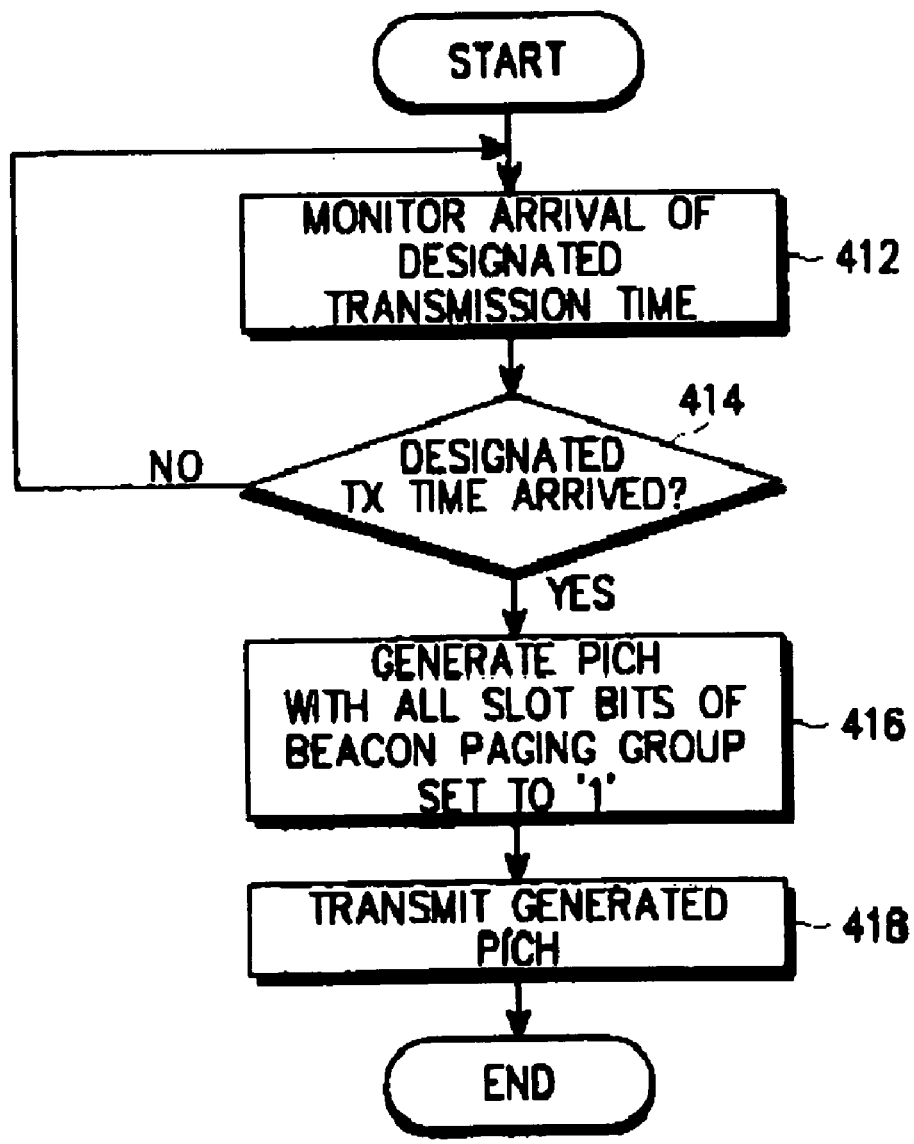
FIG. 8 is a flow chart illustrating a procedure for generating a physical channel message in a sub-BTS according to an embodiment of the present invention.

With reference to FIG. 8, a detailed description will be made regarding an operation in which the sub-BTS 80 transmits the beacon paging group frame to the mobile terminals located in the sub-cell 70 in response to a paging request. This operation corresponds to the above-stated third operation.

The sub-BTS 80 determines in step 412 whether a transmission time point of the beacon paging group frame has arrived. A method for determining whether the transmission time point of the beacon paging group frame has arrived is divided into one method for carrying out the determination in response to an enable request from the RNC 40, and another method for previously receiving information required for determining the transmission time point of PICH is by examining the SFN established by the main cell through transmitting the SFN of the CPICH and BCH of the main cell. When using the former method for determining arrival of the transmission time point upon receipt of the enable request from the RNC 40, it is most important to synchronize the transmission time point with PICH generated from the RNC 40. In other words, the beacon paging group frame should be exactly created in a region to which the beacon paging group frame out of the frames constituting the PICH is assigned, as stated above. Therefore, there have been proposed several methods for synchronizing the RNC 40 with the sub-BTS 80, and the typical method can be divided into a wire synchronization method and a wireless synchronization method.

The sub-BTS 80 determines in step 414 whether the designated transmission time point has arrived, based on the monitoring result of step 412. If it is determined in step 414 that the designated transmission time point has not arrived, the sub-BTS 80 returns to step 412 and continuously monitors arrival of the designated transmission time point. Otherwise, if it is determined in step 414 that the designated transmission time point has arrived, the sub-BTS 80 generates a paging message in step 416. The paging message generated from the sub-BTS 80 has a message format in which the frames constituting the PICH, includes the beacon paging group frame which is set to '1'. After completing generation of the beacon paging group frame in step 416, the sub-BTS 80 transmits the PICH having the generated beacon paging group frame to the mobile terminals located in the sub-cell 70, in step 418.

According to the description of the above-stated first to third operations, the broadcasting channel message and the PICH transmitted from the main BTS 60 is received at every mobile terminal located in the main cell 50, and the PICH including the beacon paging group frame transmitted from the sub-BTS 80 is received at only the mobile terminals which are located in both the sub-cell 70 and the main cell 50. This can be realized by controlling transmission power of the sub-BTS 80 which forms the sub-cell 70. Accordingly, when paging occurs, the mobile terminal can receive or cannot receive the beacon paging group frame according to whether it is located in the sub-cell 70, thereby providing an improved service.

The embodiment of the present invention proposes a scheme for switching a paging alert mode of the mobile terminal using the improved service. That is, when the mobile terminal is located in a position where it cannot receive the beacon paging group frame transmitted from the sub-BTS, the mobile terminal operates in the alert mode set by the subscriber, and otherwise, when the mobile terminal is located in a position where it can receive the beacon paging group frame, the mobile terminal operates in the mute mode in which paging is alerted silently.

Next, a detailed description will be made regarding the above-stated fourth and fifth operations together with the structure for switching the paging alert mode of the mobile terminal using the improved service.

Figure 9:
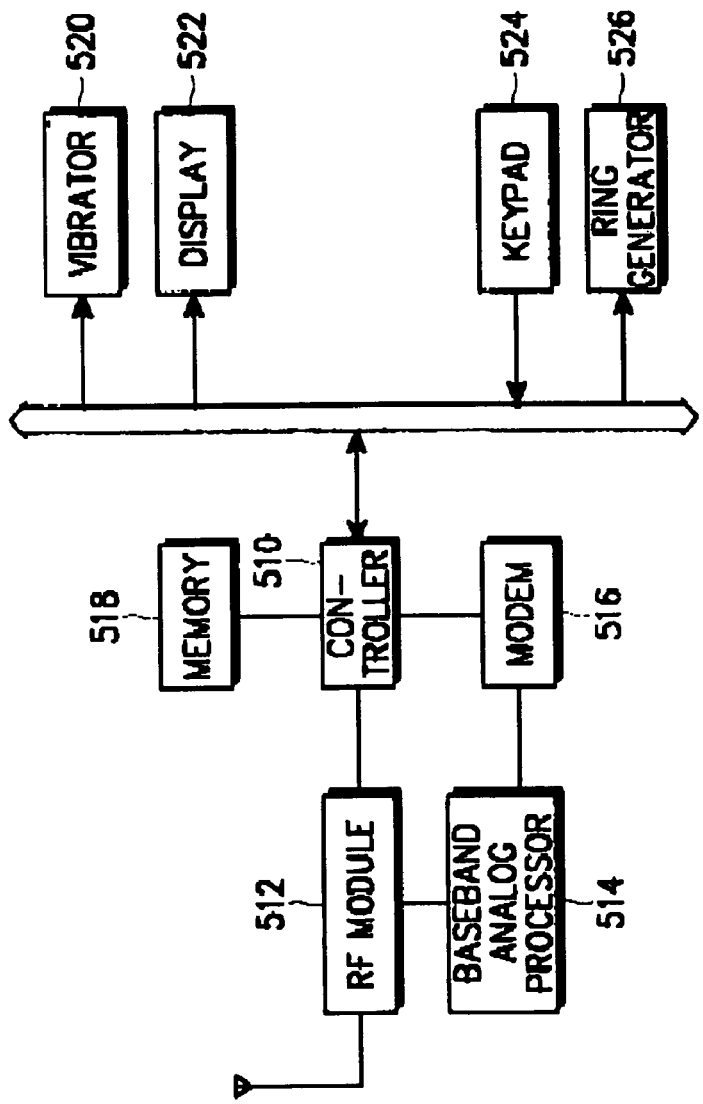
FIG. 9 is a block diagram illustrating a structure of a mobile terminal according to an embodiment of the present invention.
Figure 10:
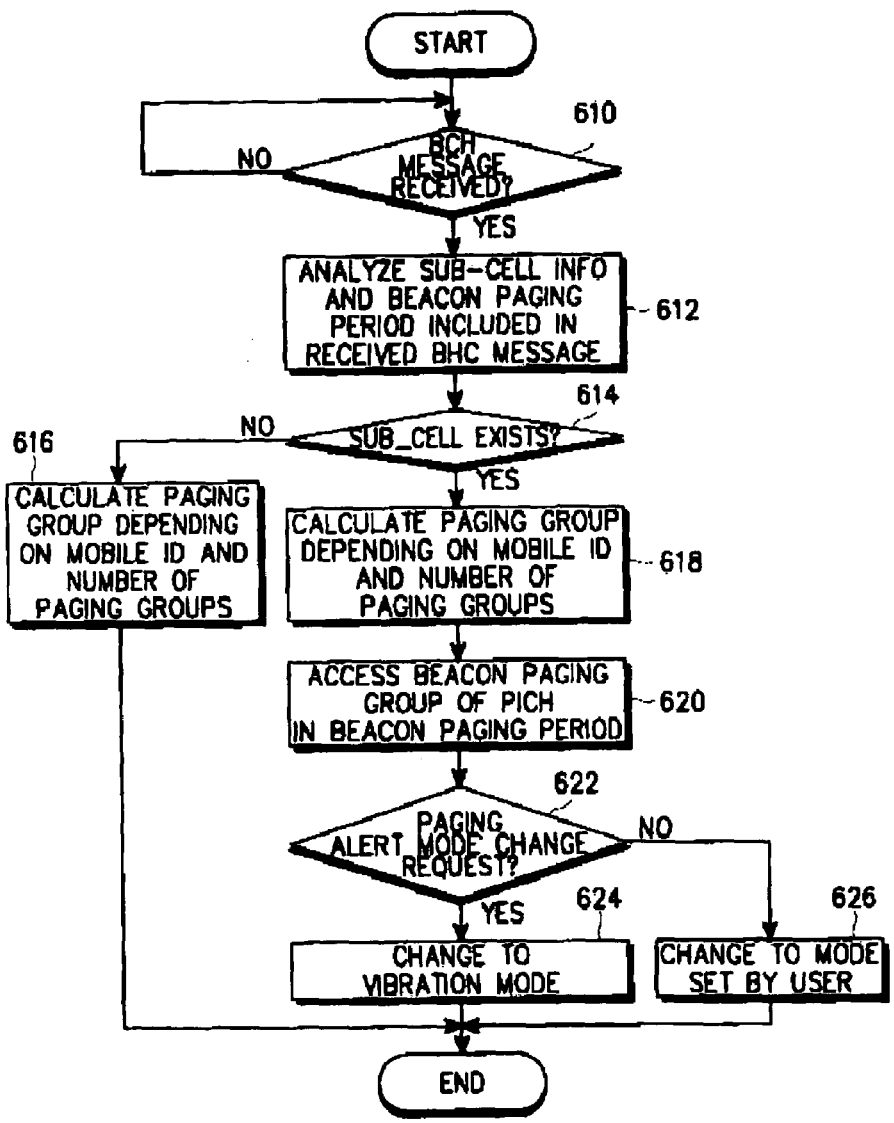
FIG. 10 is a flow chart illustrating a procedure for determining a paging alert mode in a mobile terminal according to an embodiment of the present invention.
Figure 11:
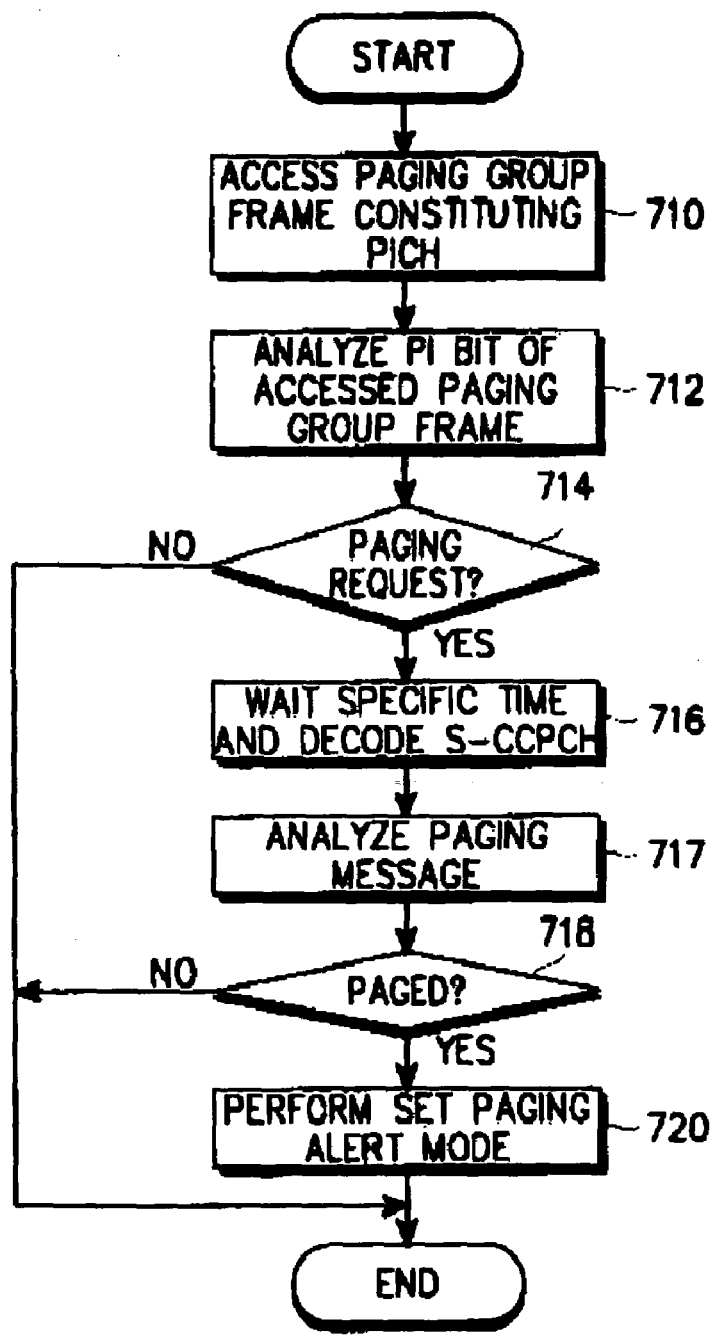
FIG. 11 is a flow chart illustrating a procedure for performing a paging alert mode in a mobile terminal according to an embodiment of the present invention.

A structure of the mobile terminal according to an embodiment of the present invention is illustrated in FIG. 9. Referring to FIG. 9, the structure of the mobile terminal will be described in detail. A controller 510 controls the overall operation of the mobile terminal. In particular, the controller 510 performs the overall control operation of automatically switching the paging alert mode according to whether the beacon paging group frame is received or not. The control procedure performed by the controller 510 to implement the present invention is illustrated in FIGS. 10 and 11, and the detailed description of it will be given later. An RF module 512 has the function of transmitting and receiving information through a wireless network. Although the information transmitted and received through the wireless network is various, the information mentioned herein focuses on the broadcasting channel message and the PICH. A baseband analog processor 514 converts a signal received through the RF module 512 to a baseband analog signal. A modem 516 analyzes information provided from the baseband analog processor 514 and provides the analyzed information to the controller 510. In particular, the modem 516 analyzes sub-cell information and a beacon paging period from the broadcasting channel message received through the baseband analog processor 514 and provides the analyzed results to the controller 510. Further, the modem 516 accesses the paging group frame corresponding to the paging group to which the mobile terminal belongs and the designated beacon paging group frame from the paging message received through the baseband analog processor 514, analyzes various information inserted in the accessed paging group frame and beacon paging group frame, and then provides the analyzed results to the controller 510. A memory 518 stores a control algorithm required to control the mobile terminal in the controller 510 and various information required to control the mobile terminal. A vibrator 520, if the paging alert mode is set to a vibration mode at a time point when paging occurs, generates vibration for indicating receipt of an incoming call under the control of the controller 510. A display 522 displays the present status of the mobile terminal under the control of the controller 510. In particular, when the paging alert mode is switched by the message received from the BTS, the display 522 displays a message for informing the subscriber of a change of the alert mode under the control of the controller 510. A keypad 524 being a combination of keys operable by the subscriber, generates key data corresponding to a key operation of the subscriber and provides the generated key data to the controller 510. A ring generator 526 generates various rings upon detection of paging under the control of the controller 510. The ring generator 526 generates a ring upon detection of paging, only when the paging alert mode is set to a bell mode. As described below, the controller 510 may change the bell mode when set when the beacon paging group frame is received.

Fourth Operation

With reference to FIG. 10, a detailed description will be made regarding an operation of setting the paging alert mode by examining the beacon paging group frame based on the beacon paging group information received through the broadcasting channel. This operation corresponds to the above-stated fourth operation.

The mobile terminal determines in step 610 whether a broadcasting channel message is received or not. The broadcasting channel message is generated by the main BTS 60 and transmitted over the broadcasting channel, and includes the sub-cell information and the beacon paging period, as stated above. Upon receipt of the broadcasting channel message in step 610, the mobile terminal analyzes the sub-cell information and the beacon paging period included in the received broadcasting channel message in step 612. After completing the analysis, the mobile terminal temporarily stores the analyzed sub-cell information and beacon paging period and then proceeds to step 614 to determine whether the cell to which it presently belongs includes a sub-cell. Existence of the sub-cell is determined according to the sub-cell information and the beacon paging period analyzed in step 612. That the broadcasting channel message includes the sub-cell information and the beacon paging period means that there exists a sub-cell. Otherwise, that the broadcasting channel message does not include the sub-cell information and the beacon paging period means that there exists no sub-cell.

Figure 1:
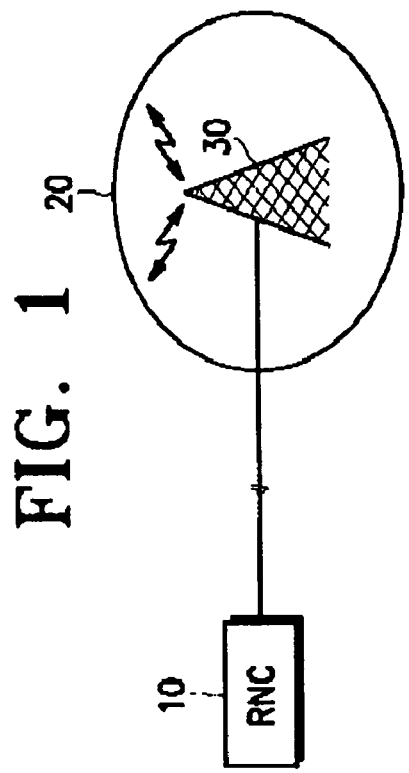
FIG. 1 is a diagram illustrating a conceptional cell structure of a general mobile communication system.
Figure 2:
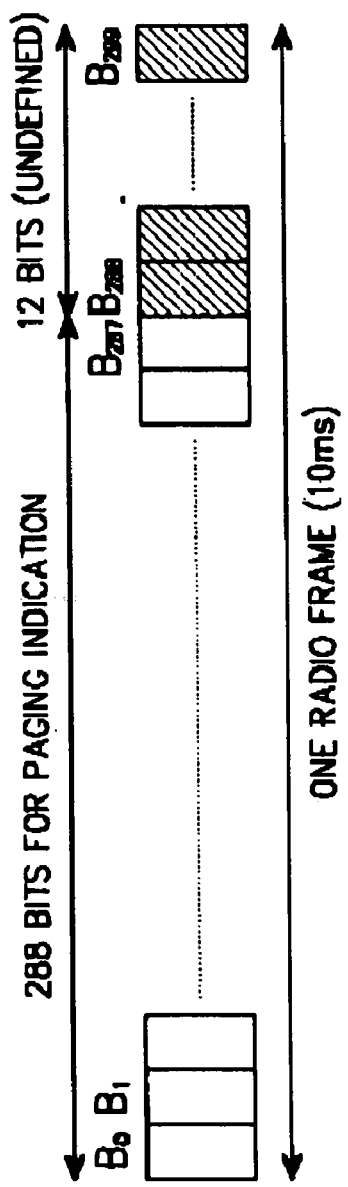
FIG. 2 is a diagram illustrating a structure of a paging message using a conventional PICH.

If it is determined in step 614 that the sub-cell 70 does not exist, the mobile terminal proceeds to step 616 and determines a paging group to which it belongs, depending on its mobile ID and the number (e.g.,144) of paging groups for the case where the sub-cell 70 does not exist. Otherwise, if it is determined in step 614 that the sub-cell 70 exists, the mobile terminal proceeds to step 618 and determines a paging group to which it belongs, depending on its mobile ID and the number (e.g.,143) of the paging groups used for actual paging excepting the beacon paging group or just use the PICH unused bits shown in FIG. 2 for beacon paging. If only unused bits are used for beacon paging, the main cell and the sub-cell can set PI equally to each other.

Meantime, after determining the paging group to which it belongs in step 618, the mobile terminal proceeds to step 620 and accesses a beacon paging group frame out of the paging group frames constituting the paging message transmitted from the BTSs 60 and 80 over the physical channel in the beacon paging period. At this point, the mobile terminal accesses not only the beacon paging group frame but also the paging group frame determined in step 618. The sub-cell transmits both the PICH of the main cell and the PICH of the sub-cell. However, the main cell transmits the unused bit in low power. The sub-cell treats the PICH transmitted from the both places as multipath component, so it is possible to demodulate them.

Accessing the paging group frame is to detect the information for paging the mobile terminal, and an operation of accessing the paging group frame will be descried later with reference to FIG. 11. Accessing the beacon paging group frame in the beacon paging period analyzed in step 612 from the broadcasting channel message should be performed on the assumption that the mobile terminal is frame-synchronized with the BTSs 60 and 80. Meanwhile, upon receipt of the beacon paging group frame through an access of the beacon paging group frame in step 620, S-CCPCH which includes the actual paging message is transmitted after certain amount of delay. After analyzing the beacon paging group information, the mobile terminal determines in step 622 whether a change of the paging alert mode is requested, depending on the analyzed beacon paging group information. The paging alert mode change request is determined by the bit values constituting the beacon paging group frame. For example, it is determined whether the mobile terminal is presently located in the sub-cell 70 by examining the number of the bits having a bit value of '1'.

Such determination is available because the beacon paging group frame transmitted from the sub-BTS 80 forming the sub-cell 70 is received only at the mobile terminals located in the sub-cell 70. Therefore, when the mobile terminal is not located in the sub-cell 70, it cannot receive the beacon paging group frame transmitted from the sub-BTS 80, thus judging that there is no paging alert mode change request.

If it is determined in step 622 that the paging alert mode change request is received, the mobile terminal changes the present paging alert mode from the bell mode, if set, to a silent alert mode, such as a vibrator mode in step 624. Changing the paging alert mode generally means that the subscriber of the mobile terminal is located in a place that requires silence. In addition, an operation of changing the paging alert mode by software is already supported by the mobile terminals, so that no additional structure is required for this operation.

Otherwise, if it is determined in step 622 that the paging alert mode change request is not received, the mobile terminal proceeds to step 626 and maintains or changes the paging alert mode to a paging alert mode set by the user, i.e., the subscriber of the mobile terminal. The operation of changing the paging alert mode to a paging alert mode set by the subscriber is also commonly supported by the mobile terminal as in the operation of step 624, so that no additional structure is required for this operation.

In addition, though not shown in the drawing, when the paging alert mode is changed in step 624 and 626, the mobile terminal displays on the display 522 a message informing the subscriber of a change of the paging alert mode.

In the forgoing description, the paging alert mode change request is limitedly used to change the paging alert mode to the silent (or mute) alert mode, where, for example, the vibrator is used to alert the user. However, the paging alert mode change request can also be used to maintain the silent alert mode or change the paging alert mode to an alert mode set by the user in a situation where the alert mode of the mobile terminal is already set to the silent alert mode. That is, the paging alert mode change request should not be construed as only a meaning of changing the paging alert mode of the mobile terminal located in the sub-cell 70, and should also include a meaning of changing the paging alert mode for the case where the mobile terminal located in the sub-cell 70 moves out of the sub-cell 70. In addition, the silent paging alert mode includes the vibration mode and other alert modes in which alert tone such as a melody is not generated.

Fifth Operation

Finally, with reference to FIG. 11, a detailed description will be made regarding an operation of alerting paging based on the paging information by examining the paging group frame provided through the physical channel. This operation corresponds to the above-stated fifth operation. The operation described below is performed after determining the paging group to which the mobile terminal belongs, in steps 616 and 618 of FIG. 10. The operation of FIG. 11 will be described on the assumption that the paging group to which the mobile terminal belongs is already determined.

In step 710, the mobile terminal accesses the paging group frame corresponding to the previously determined paging group. The paging group frame is a frame designated by the determined paging group out of the paging group frames constituting the PICH transmitted from the RNC 40 through the main BTS 60. After accessing the corresponding paging group frame in step 710, the mobile terminal analyzes the PI bit values of the accessed paging group frame in step 712. Analyzing the PI bit values is to determine whether there is an incoming call to the paging group to which the mobile terminal belongs. After completing the analysis of the PI bit values in step 712, the mobile terminal determines in step 714 whether there is a paging request, based on the analyzed PI bit values. For example, when the PI bits have the values of '1', the mobile terminal determines that there is a paging request. Otherwise, the mobile terminal determines that there is no paging request. If it is determine in step 714 that there is no paging request, the mobile terminal accesses again the frame of paging group to which it belongs out of the paging group frames constituting the PICH received in the next period and continuously determines whether there exists the paging request, through the above operation.

However, if it is determined in step 714 that there is the paging request, the mobile terminal demodulates the S-CCPCH which includes actual paging message in step 716. After demodulation, the mobile terminal analyzes the paging message to see if the paging message includes the ID identifying the mobile terminal. After completing the analysis of the identification information of the mobile terminal in step 716, the mobile terminal determines in step 718 whether it is paged. Whether the mobile terminal is paged is determined by comparing the analyzed identification information of the mobile terminal with its identification information to see if they are identical to each other. For the identification information, a mobile ID can be used which is typically used to identify the mobile terminal.

If it is determined in step 718 that the paging request is for paging the mobile terminal, it performs the paging alert mode in step 720. As the mobile terminal performs the paging alert mode, the subscriber can answer the call by detecting the paging alert in the paging alert mode set in accordance with the operation of FIG. 10. Therefore, the mobile terminal can detect the incoming call by the improved paging alert mode according to the place where it is presently located.

As described above, the invention informs the mobile terminal of existence of the sub-cell through the broadcasting channel, so that the mobile terminal examines the beacon paging group frame only when the sub-cell exists and determines its paging alert mode according to the examination result of the beacon paging group frame. Therefore, when the mobile terminal is located in a place such as a music hall and a public conference room where the alert tone of the mobile terminal should be restricted, the paging alert mode is automatically changed to the silent alert mode under the control of the BTS, thus contributing to convenience of the subscriber and preventing others from being troubled by the noisy alert tone.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining a paging alert mode of a mobile terminal in a mobile communication system, comprising the steps of:

determining whether there exists a sub-BTS (Base Transceiver System), based on a broadcasting channel message provided from a main BTS;

receiving a beacon paging group frame from the sub-BTS, when the sub-BTS exists; and upon receipt of the beacon paging group frame, changing the paging alert mode to a predetermined paging alert mode by determining that the mobile terminal is located in a sub-cell formed by the sub-BTS, and changing the paging alert mode to a silent paging alert mode, and upon failure to receive the beacon paging group frame, determining that the mobile terminal is not located in the sub-cell, and changing the paging alert mode to a paging alert mode set by a subscriber, wherein the sub-BTS controls a sub-cell, which is located within a main cell that is controlled by the main BTS.

2. The method as claimed in claim 1, wherein the broadcasting channel message is simultaneously transmitted to every mobile terminal located in the main cell by the main BTS.

3. The method as claimed in claim 1, wherein the silent paging alert mode is a vibration mode.

4. The method as claimed in claim 1, wherein the silent paging alert mode is a display mode.

5. The method as claimed in claim 1, wherein the beacon paging group frame is provided through a physical channel of the sub-cell.

6. A method for determining a paging alert mode of a mobile terminal in a mobile communication system, comprising the steps of:

receiving a broadcasting channel message;

analyzing sub-cell information and a beacon paging period from the broadcasting channel message;

determining whether a main cell formed by a main BTS includes a sub-cell, depending on the analysis result;

receiving, when the sub-cell exists, a beacon paging group frame provided from a sub-BTS of the sub-cell synchronized with the main cell in the beacon paging period;

upon receipt of the beacon paging group frame, setting the paging alert mode of the mobile terminal to a silent paging alert mode;

upon failure to receive the beacon paging group frame, setting the paging alert mode of the mobile terminal to a paging alert mode designated by a user;

determining a paging group using an ID of the mobile terminal and the number of the paging group frames in a PICH provided form the main BTS through a physical channel;

accessing a paging group frame corresponding to the determined paging group out of the paging group frames in the PICH received from the main BTS in sync with the beacon paging group frame; and analyzing the accessed paging group frame, and upon detecting a paging request, indicating receipt of an incoming call by the set paging alert mode.

7. The method as claimed in claim 6, wherein the broadcasting channel message is simultaneously transmitted to every mobile terminal located in the main cell by the main BTS.

8. The method as claimed in claim 6, the silent paging alert mode is a vibration mode.

9. The method as claimed in claim 6, wherein the silent paging alert mode is a display mode.

10. The method as claimed in claim 6, wherein the beacon paging group frame is provided through a physical channel of the sub-cell.

11. The method as claimed in claim 6, wherein the number of the paging groups in the PICH provided through the physical channel of the main cell is determined according to whether the sub-cell exists.

12. A method for determining a paging alert mode in a mobile communication system, comprising the steps of:
   inserting sub-cell information for a sub-cell and a beacon paging period in a broadcasting channel message of a main BTS and transmitting the broadcasting channel message, when the sub-cell exists in a main cell formed by the main BTS;
   upon receipt of a paging request from a core network, transmitting, in a radio network controller, paging request information with a paging group frame to which a paging-requested mobile terminal belongs, out of paging group frames in a PICH; and
   transmitting, in a sub-BTS for forming the sub-cell, a beacon paging group frame in sync with the paging group frames, the beacon paging frame group requesting a change of the paging alert mode.

13. The method as claimed in claim 12, wherein the broadcasting channel message transmitting step comprises the steps of:
   determining whether there exists the sub-BTS for forming the sub-cell in the main cell formed by the main BTS;
   designating, in the main BTS, a beacon paging group frame for the sub-cell, when the sub-BTS exists;
   determining a beacon paging period at which the beacon paging group frame is to be transmitted;
   generating a broadcasting channel message including the sub-cell information with an ID designating the beacon paging group frame and the determined beacon paging period; and
   transmitting the generated broadcasting channel message to every mobile terminal located in the main cell through a broadcasting channel.

14. The method as claimed in claim 12, wherein the paging request information transmitting step comprises the steps of:
   monitoring a paging request from the core network;
   upon receipt of the paging request, determining whether there exists the sub-BTS;
   determining, when the sub-BTS exists, a paging group depending on the number of the paging group frames in the PICH excepting the designated beacon paging group frame and an ID of the mobile terminal to be paged;
   determining, when the sub-BTS does not exist, a paging group depending on the number of the paging group frames in the PICH and the ID of the mobile terminal to be paged; and
   transmitting paging request information with the paging group frame corresponding to the determined paging group through a physical channel.

15. The method as claimed in claim 12, wherein the beacon paging group frame transmitting step comprises the steps of:
   detecting an interrupt provided from the radio network controller at a transmission time point of the beacon paging group frame; and
   upon detecting the interrupt, transmitting, in the sub-BTS, a beacon paging group frame in which all bit values for requesting a change of the paging alert mode are '1', through the physical channel.

16. The method as claimed in claim 15, wherein the beacon paging period is determined as a multiple of a period of the PICH.

17. An apparatus for determining a paging alert mode in a mobile communication system, comprising:
   a main BTS for forming a main cell, and inserting, when there exists a sub-cell in the main cell, sub-cell information for the sub-cell and a beacon paging period in a broadcasting channel message before transmission;
   a radio network controller for transmitting paging request information with the paging group frame to which a paging-requested mobile terminal belongs, out of the paging group frames in the PICH;
   a sub-BTS for forming the sub-cell, and transmitting a beacon paging group frame requesting a change of the paging alert mode in response to an interrupt from the radio network controller; and
   a mobile terminal for setting the paging alert mode according to whether the beacon paging group frame is accessed, and performing the set paging alert mode when paging is detected by accessing the paging group frame.

* * * * *